United States Patent [19]
Ozaki et al.

[11] Patent Number: 4,809,799
[45] Date of Patent: Mar. 7, 1989

[54] POWER UNIT MOUNTING STRUCTURE

[75] Inventors: Yoichi Ozaki, Musashimurayama; Shinjiro Yukawa, Atsugi; Takanobu Ide, Isehara; Masami Tsuji, Tokorozawa, all of Japan

[73] Assignee: Nissan Motor Co., Ltd., Japan

[21] Appl. No.: 941,319

[22] Filed: Dec. 15, 1986

[30] Foreign Application Priority Data

Dec. 17, 1985 [JP] Japan .................. 60-194907[U]

[51] Int. Cl.$^4$ .................................................. B60K 5/12
[52] U.S. Cl. .................................... 180/292; 180/297; 180/312; 248/635; 267/257; 267/292
[58] Field of Search ............... 180/292, 297, 300, 312; 248/635, 638, 659; 267/21 R, 21 A, 63 A, 63 R, 57.1 A, 52.1 R, 141.2

[56] References Cited

U.S. PATENT DOCUMENTS

| | | | |
|---|---|---|---|
| 2,925,973 | 2/1960 | Aebersold | 248/659 X |
| 3,894,604 | 7/1975 | Grooseau | 180/297 |
| 4,151,822 | 5/1979 | Miura et al. | 267/63 R X |
| 4,271,920 | 6/1981 | Barthelemy | 180/297 X |
| 4,377,218 | 3/1983 | Fukushima | 180/300 |
| 4,406,344 | 9/1983 | Fukushima | 267/63 R X |
| 4,450,926 | 5/1984 | Suzuki | 180/297 X |
| 4,494,723 | 1/1985 | Kobuki et al. | 248/635 |

FOREIGN PATENT DOCUMENTS 572648  7/1962  Belgium .................. 180/292

OTHER PUBLICATIONS

Nissan Service Bulletin (published in Sep. 1985).

Primary Examiner—David M. Mitchell
Assistant Examiner—Brian L. Johnson
Attorney, Agent, or Firm—Leydig, Voit & Mayer

[57] ABSTRACT

A power unit mounting structure through which a power unit of an automotive vehicle is supported to a vehicle body. The power unit mounting structure consists of a vehicle body side mount bracket bolted at its one end section to the vehicle body, and a power unit side mount bracket securely connected at its one end section to a transmission case of the power unit. The other end sections of the vehicle body side and power unit side mount brackets are elastically connected through an insulator member with each other. The insulator member is securely disposed inside a rigid support member secured to the other end section of the vehicle body side mount bracket. The insulator member is located lower in level than a joint portion of the vehicle body side mount bracket with the vehicle body. Additionally, a support member is disposed between the insulator support member and a center frame member securely connected to the vehicle body at the joint portion, thereby reinforcing the vehicle body side mount bracket.

14 Claims, 4 Drawing Sheets

POWER UNIT MOUNTING STRUCTURE

BACKGROUND OF THE INVENTION

1. Field of the Invention

The present invention relates generally to a power unit mounting structure through which a power unit is supported to a vehicle body, and more particularly to an improvement in such a power unit mounting structure of the type wherein vehicle body side and power unit side mount brackets are elastically connected through an insulator member with each other.

2. Description of the Prior Art

It is known in the art that a power unit of an automotive vehicle is supported through a power unit mounting structure to a vehicle body. The power unit mounting structure consists of a vehicle body side rear mount bracket bolted to the vehicle body, and a power unit side rear mount bracket secured to the power unit. The vehicle body side and power unit side rear mount brackets are connected through an insulator member with each other. However, such a power unit mounting structure is arranged to support the power unit in an overhung manner and therefore the vehicle body side rear mount bracket is unavoidably low in rigidity, so that the rear mount bracket tends to make its resonance vibration within a frequency range where noise is critical. As a result, vibration from the power unit is transmitted in an amplified state to the vehicle body, thus generating considerable noise within a vehicle passenger compartment.

SUMMARY OF THE INVENTION

A power unit mounting structure of the present invention consists of a vehicle body side support member securely connected at its first end section to a vehicle body to form a first joint section, and a power unit side support member securely connected at its first end section to a power unit. The first joint portion is separate from the second joint portion. The second end sections of the vehicle body side and power unit side support members are elastically connected through an insulator member with each other. Additionally, a support member is provided to support therethrough the power unit onto an elongate and rigid reinforcement member securely connected to the vehicle body.

Accordingly, the vehicle body side support member is supported through the support member to the reinforcement member and therefore raised in rigidity, thereby lowering vibration transmission rate thereof within a frequency range where noise is critical. This reduces vibration input from the power unit to the vehicle body, thus suppressing noise within a vehicle passenger compartment at lower levels.

BRIEF DESCRIPTION OF THE DRAWINGS

In the drawings, like reference numerals designate corresponding elements and parts, and in which.

DETAILED DESCRIPTION OF THE INVENTION

Figure 1:
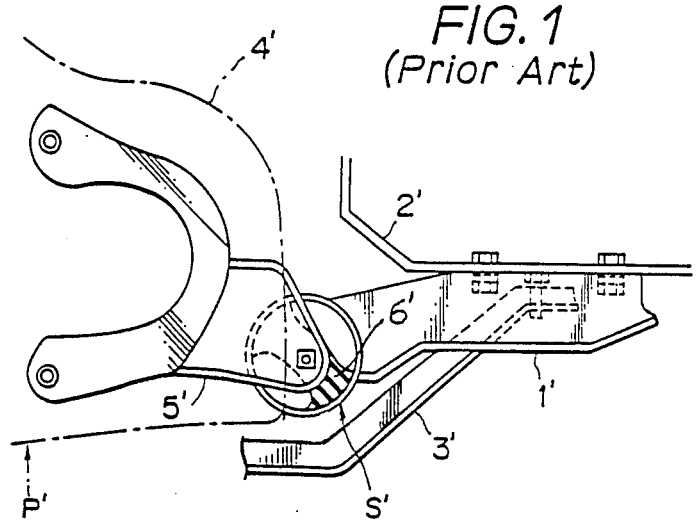
FIG. 1 is a side view of a conventional power unit mounting structure.

To facilitate understanding of the present invention, a brief reference will be made to a conventional power unit mounting structure S' through which a power unit P' including a transmission case 4' is mounted onto the a vehicle body 2', depicted in FIG. 1. Referring to FIG. 1, the power unit mounting structure S' includes a vehicle body side rear mount bracket 1' and a power unit side rear mount bracket 5'. The vehicle body side rear mount bracket 1' is bolted at its one end section to the vehicle body 2'. The other end section of the vehicle body side rear mount bracket 1' is elastically connected through an insulator member 6' with one end section of the power unit side rear mount bracket 5' which is in turn securely connected at the other end section thereof to the transmission case 4'. Additionally, an elongate and rigid reinforcement member herein shown as a center frame 3' is bolted at its one end to the vehicle body 2' at a joint portion to which the vehicle body side rear mount bracket 1' is bolted. Thus, the transmission case 4' is supported to the vehicle body 2' in an overhung manner by means of the mounting structure S'.

However, with such a conventional power unit mounting structure S', a joint portion (though the insulator member 6') between the vehicle body side and power unit side rear mount brackets is lower in level than the joint portion of the vehicle body side rear mount bracket 1' with the vehicle body 2', so that the vehicle body side rear mount bracket 1' for supporting the power unit P' in the overhung manner is unavoidably lower in rigidity. Accordingly, the vehicle body side rear mount bracket 1' tends to have a resonance vibration within a frequency range where vehicle noise is critical, so that power unit vibration transmitted through the vehicle body side rear mount bracket 1' is amplified and transmitted to the vehicle body 2' thereby generating considerable noise within a vehicle passenger compartment.

Figure 2:
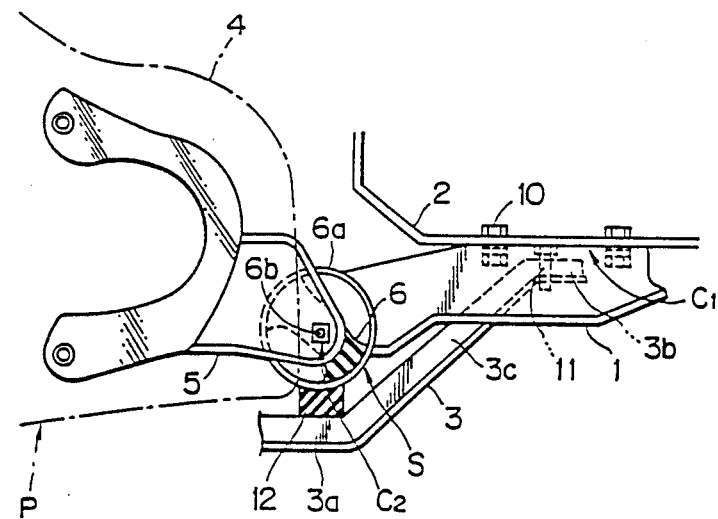
FIG. 2 is a side view of a first embodiment of a power unit mounting structure in accordance with the present invention.
Figure 3:
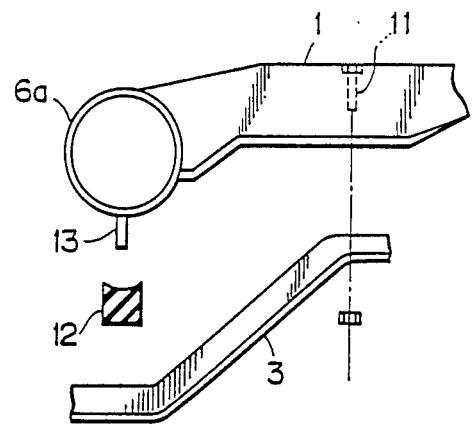
FIG. 3 is an exploded side view of the power unit mounting structure of FIG. 2.

In view of the above description of the conventional power unit mounting structure, reference is now made to FIGS. 2 to 8, and specifically to FIGS. 2 and 3 wherein a first embodiment of the power unit mounting structure according to the present invention is illustrated by the character S. In this embodiment, a power unit P of an automotive vehicle (not shown) is mounted through the power unit mounting structure S to a vehicle body 2. The power unit mounting structure S comprises a vehicle body side rear mount bracket or first support member 1 which is securely connected at its one or rear end section to a horizontal section of the vehicle body 2 by bolts 10, forming a first joint portion $C_1$. The other or front end section of the rear mount bracket 1 is rigidly provided with a cylindrical frame member 6a inside which a vibration insulator member 6 is securely disposed. The insulator member 6 is made of an elastomeric material such as rubber. A power unit side rear mount bracket or second support member 5 is securely connected at its one or front end section to the rear section of a transmission case 4 forming part of the power unit P. The power unit P includes also an engine (not shown) which is forward and transversely mounted. The other or rear end section of the power unit side rear mount bracket 5 is connected to the insulator member 6 through a center axis member 6b disposed at the central portion of the insulator member 6, forming a second joint portion $C_2$. In other words, the vehicle body side and power unit side rear mount brackets 1, 5 are elastically connected through the insulator member 6 with each other. Thus, the transmission case rear section is supported or mounted through the mounting structure S to the vehicle body 2, in which the first joint portion $C_1$ is higher in level or vertical direction by a predetermined distance relative to the vehicle than the second joint portion $C_2$ containing the center axis member 6b.

An elongate and rigid reinforcement member shown as a center frame 3 for reinforcing the vehicle body 2 extends along the center axis of the vehicle and is rigidly connected to the vehicle body 2 at the first joint portion $C_1$ by a bolt 11. As shown, the center frame 3 has a lower horizontal section 3a extending below the power unit P, a upper horizontal section 3b connected to the vehicle body 2, and a sloped or inclined section 3c connecting the lower and upper horizontal sections 3a and 3b, respectively. The lower horizontal section 3a is parallel with the vehicle body horizontal section and located below and spaced from the cylindrical frame member 6a for the insulator member 6. A support and reinforcement member or third support member 12 is disposed between the center frame lower horizontal section 3a and the cylindrical frame member 6a for the insulator member 6 so that the vehicle side rear mount bracket 1 is supported through the third support member 12 onto the center frame 3. As shown in FIG. 3, the third support member 12 is made of an elastomeric material such as rubber and secured to the cylindrical member 6a in such a manner that a pin 13 projected from the cylindrical member 6a is inserted into the support member 12. The pin 13 is secured to the outer peripheral surface of the cylindrical frame member 6a, for example, by means of welding. The support member 12 is located below the second joint portion $C_2$, i.e., in such a manner that a vertical plane passing through the axis of the center axis member 6b of the insulator member 6 also passes through the central part of the support inforcement member 12. It will be understood that location of the support member 12 is also achieved by inserting the pin 13 into the support member 12. The pin 13 may be rigidly secured to the center frame 3. Additionally, the support member 12 may be bonded to either one of the side of the vehicle body side rear mount bracket 1 and the side of the center frame 3, for example, by means of adhesion.

While the support member 12 made of an elastomeric material has been shown and described in the first embodiment, it will be understood that the support member 12 may be formed of other elastic materials, for example, spring metal.

Figure 4:
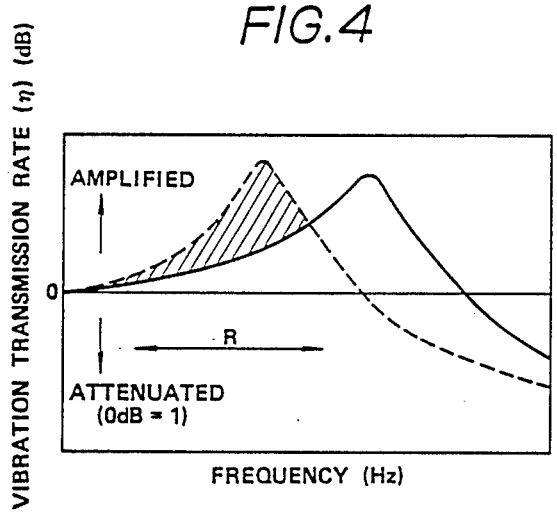
FIGS. 4 and 5 are graphs showing variations of vibration transmission rate according to the power unit mounting structure of FIGS. 2 and 3, in terms of vibrational frequency.

The manner of operation of the thus arranged power unit mounting structure will be discussed hereinafter with reference to FIGS. 4 to 5.

With the power unit mounting structure of the first embodiment in which the vehicle body side rear mount bracket 1 is supported onto the center frame 3 through the elastomeric support member 12 disposed between the front end section of the rear mount bracket 1 and the center frame 3, noise level of the vehicle can be effectively lowered by the following three functions.

First, provision of the support reinforcement member 12 cancels the overhung structure of the power unit P (the transmission case 4) with the vehicle side rear mount bracket 1 thereby to increase the rigidity of the vehicle side rear mount bracket 1. As a result, the resonance frequency of the vehicle side rear mount bracket 1 is raised within a frequency range R where noise or vibration is critical, as indicated in FIG. 4 in which vibration transmission rate $\eta$ is lowered by an amount corresponding to an oblique-lined part, thus suppressing noise within the vehicle passenger compartment at lower levels. The above-mentioned vibration transmission rate $\eta$ is represented as $V_1/V_2$ where $V_1$ is vibrational force input to the front end section of the vehicle body side rear mount bracket 1, and $V_2$ is vibrational force input to the vehicle body 2 from the vehicle body side rear mount bracket 1.

Figure 5:
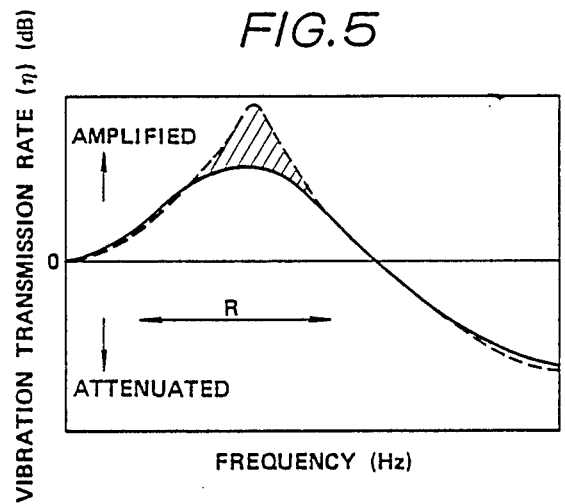

Second, by virtue of the vibration damping capability of the elastomeric support member 12 itself, the vibration transmission rate $\eta$ is lowered by an amount corresponding to an oblique-lined part in FIG. 5, thus suppressing noise within the vehicle passenger compartment at lower levels.

Third, vibration from the power unit P transmitted to the front end section of the vehicle side rear mount bracket 1 is dividingly transmitted both to the vehicle body side rear mount bracket 1 and the center frame 3 to form two routed vibrations and then transmitted to the vehicle body 2. In this process, the two routed vibrations are cancelled with each other because the natural frequencies of the vehicle body side rear mount bracket 1 and the elongate and rigid reinforcement member shown as the center frame 3 are different from each other. More specifically, in the case where the resonance frequency of the center frame 3 is $f_1$ Hz and the resonance frequency of the vehicle body side rear mount bracket 1 is $f_2$ Hz, the vibrations input through the two routes (vehicle body side rear mount bracket 1 and the center frame 3) to the vehicle body 2 shift by 180 degrees in phase $\lambda$ within a frequency range higher than $f_1$ and lower than $f_2$, in which both the vibrations are cancelled with each other. As a result, the vibration transmission rate $\eta$ within the frequency range higher than $f_1$ and lower than $f_2$ can be lowered thereby suppressing noise within the vehicle passenger compartment at lower levels.

Figure 6:
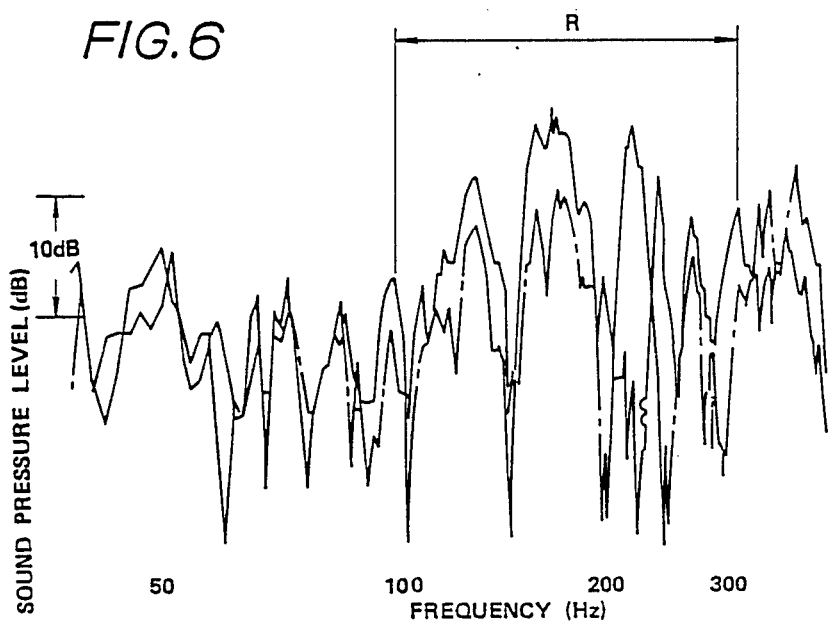
FIGS. 6 and 7 are graphs showing comparison in noise characteristics in a vehicle passenger compartment between a vehicle provided with the power unit mounting structure of FIG. 2 and the vehicle provided with the conventional power unit mounting structure of FIG. 1.
Figure 7:
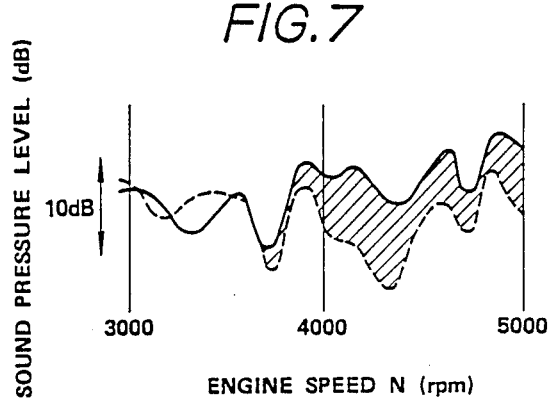

FIGS. 6 and 7 show comparison in vibration characteristics between the power unit mounting structure of the first embodiment of the present invention and the conventional power unit mounting structure as shown in FIG. 1, in which data were obtained upon conducting experiment where the power unit mounting structure was installed in the same automotive vehicle. In FIG. 6, a dot-dash line indicates sound pressure level (dB/Kg) within the vehicle passenger compartment when a unit vibrational force in the upward and downward direction was input to the vehicle body side rear mount bracket in the vehicle provided with the power unit mounting structure of the first embodiment of the present invention, and a solid line indicates the corresponding sound pressure level in the vehicle provided with the conventional power unit mounting structure as shown in FIG. 1. In FIG. 7, a dotted line indicates sound pressure level (dB) within the vehicle passenger compartment when the engine of the power unit was operated to vary engine speed in the vehicle provided with the power unit mounting structure of the first embodiment of the present invention, and a solid line indicates the corresponding sound pressure level in the vehicle provided with the conventional power unit mounting structure as shown in FIG. 1.

The graphs of FIGS. 6 and 7 demonstrate the fact that the vibration and sound attenuation effect of the power unit mounting structure of the present invention is greatly improved relative to the conventional power unit mounting structure particularly in the frequency range where noise is critical and in an engine speed range of from 4000 to 5000 rpm.

Figure 8:
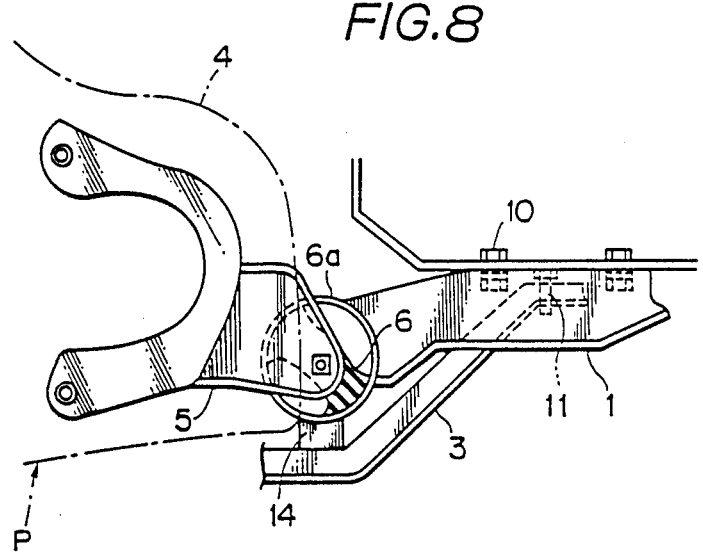
FIG. 8 is a side view similar to FIG. 2 but showing a second embodiment of the power unit mounting structure in accordance with the present invention.

FIG. 8 illustrates a second embodiment of the power unit mounting structure according to the present invention, which is similar to the first embodiment of FIGS. 2 and 3 with the exception that a third support member 14 formed of metallic rigid material is used in place of the third support member 12 of the first embodiment. It will be understood that this embodiment can also exhibit similar vibration and noise attenuation effect to the first embodiment.

What is claimed is:

1. A power unit mounting structure through which a power unit is supported by a vehicle body, said structure comprising:
    a first support member having a first end section securely connected to the vehicle body to form a first joint portion, and a second end section which is separate from the vehicle body;
    a second support member having a first end section securely connected to the power unit, and a second end section;
    a vibration insulator through which said second end section of said first support member is elastically connected to said second end section of said second support member to form a second joint portion;
    means for allowing said first joint portion to be separated from said second joint portion;
    an elongate and rigid reinforcement member for reinforcing the vehicle body which is securely connected to the vehicle body at said first joint portion and extends below said second joint portion; and
    a third support member which is disposed between said second end section of said first support member and said rigid reinforcement member to support said second end section of said first support member on said rigid reinforcement member.

2. A power unit mounting structure as claimed in claim 1, wherein said first joint portion is disposed above said second joint portion.

3. A power unit mounting structure as claimed in claim 1, wherein said vibration insulator member is made of an elastomeric material.

4. A power unit mounting structure as claimed in claim 3, wherein said vibration insulator member is secured to said first support member second end section.

5. A power unit mounting structure as claimed in claim 4, further comprising a rigid frame member secured to said first support member second end section, wherein said vibration insulator member is securely disposed inside said rigid frame member.

6. A power unit mounting as claimed in claim 1, said first support member being securely connected to the vehicle body at the first end section and being supported onto said rigid reinforcement member at the second end portion, the supporting of both end sections of said first support member increasing its rigidity and supporting the power unit to reduce transmission of power unit vibration through said power unit mounting structure to the vehicle body in a predetermined frequency range.

7. A power unit mounting structure according to claim 6 wherein the frequency range is from about 100 Hz to 300 Hz and is produced by power unit speed in a range of about 4000 to 5000 rpm.

8. A power unit mounting structure as claimed in claim 1, wherein said first support member has a first natural frequency and provides a first route for transmission of vibrations from said power unit to the vehicle body,
    said reinforcement member has a second natural frequency different from the first natural frequency and provides a second route for transmission of vibrations from said power unit to the vehicle body,
    and wherein said first and second natural frequencies are different such that vibrations transmitted through the first and second routes are out of phase within a specified frequency range and are substantially cancelled by each other, to reduce vibration transmission rate through the power unit mounting structure thereby reducing noise from the power unit in the vehicle body.

9. A power unit mounting structure through which a power unit is supported by a vehicle body, said structure comprising:
    a first support member having a first end section securely connected to the vehicle body to form a first joint portion, and a second end section which is separate from the vehicle body;
    a second support member having a first end section securely connected to the power unit and a second end section;
    a vibration insulator which is made of an elastomeric material through which said second end section of said first support member is elastically connected to said second end section of said second support member to form a second joint portion, said vibration insulator being secured to said second end section of said first support member;
    means for allowing said first joint portion to be separated from said second joint portion;
    an elongate and rigid reinforcement member for reinforcing the vehicle body which is securely connected to the vehicle body and extends below said second joint portion;
    a third support member which is made of an elastic material and which is disposed between said second end section of said first support member and said rigid reinforcement member to support said second end section of said first support member on said rigid reinforcement member; and
    a rigid frame member which is secured to said second end section of said first support member, said vibration insulator being securely disposed inside said rigid frame member, said third support member being located between said rigid frame member and said reinforcement member.

10. A power unit mounting structure as claimed in claim 9, wherein said elastic material is an elastomeric material.

11. A power unit mounting structure as claimed in claim 10, further comprising a pin member projected outwardly from said rigid frame member and inserted into said third support member.

12. A power unit mounting structure as claimed in claim 9, wherein said rigid frame member has a horizontal section to which said third support member contacts.

13. A power unit mounting structure as claimed in claim 9, further comprising a center axis member disposed at a central portion of said vibration insulator member, said second support member second end section being connected to said center axis member, axis of said center axis member lying in a vertical plane passing through said third support member.

14. A power unit mounting structure as claimed in claim 12, wherein said first support member elongates generally horizontally and is bolted at its first end section to a horizontal section of the vehicle body, said reinforcement member horizontal section being parallel with the vehicle body horizontal section.

* * * * *